United States Patent [19]

Allington et al.

[11] Patent Number: 4,933,825
[45] Date of Patent: Jun. 12, 1990

[54] POWER SUPPLY

[75] Inventors: Robert W. Allington; Larry J. Friling, both of Lincoln, Nebr.

[73] Assignee: Isco, Inc., Lincoln, Nebr.

[21] Appl. No.: 388,767

[22] Filed: Aug. 2, 1989

Related U.S. Application Data

[63] Continuation of Ser. No. 36,308, Apr. 9, 1987, abandoned.

[51] Int. Cl.$^5$ .................................... H02M 3/335
[52] U.S. Cl. ................................. 363/16; 363/50; 323/902
[58] Field of Search .................. 363/16, 19, 21, 23, 363/25, 50, 56, 37, 89, 79, 80, 65; 323/277, 282, 283, 285, 902

[56] References Cited

U.S. PATENT DOCUMENTS

| | | | |
|---|---|---|---|
| 4,264,950 | 4/1981 | Bockhorst et al. | 363/25 |
| 4,428,017 | 1/1984 | Vaerewyck et al. | 361/31 |
| 4,631,655 | 12/1986 | van Husen | 363/50 |
| 4,673,864 | 6/1987 | Dessen et al. | 323/902 |
| 4,688,161 | 8/1987 | Covington | 363/37 |

Primary Examiner—Patrick R. Salce
Assistant Examiner—Emanuel Todd Voeltz
Attorney, Agent, or Firm—Vincent L. Carney

[57] ABSTRACT

To reduce the cost of insulation in a high-voltage power supply capable of constant current or constant power operation, the power supply includes an optical self-powered feedback circuit from its high-voltage section to the low-voltage section to control the output of the power supply. The feedback circuit includes within the high-voltage section of the power supply: (1) a sensing circuit for obtaining an amplitude modulated signal related to current flowing through at least certain output terminals; (2) a voltage-to-frequency converter for converting the amplitude modulated signal to a frequency modulated signal; (3) a pulse shaper for generating pulses having a duration of less than 3 microseconds to reduce power consumption; and (4) a light emitting diode. Light from the diode is transmitted to a low-voltage section where it is utilized in the feedback network. The high-voltage feedback circuitry utilizes less than 75 microamps.

51 Claims, 5 Drawing Sheets

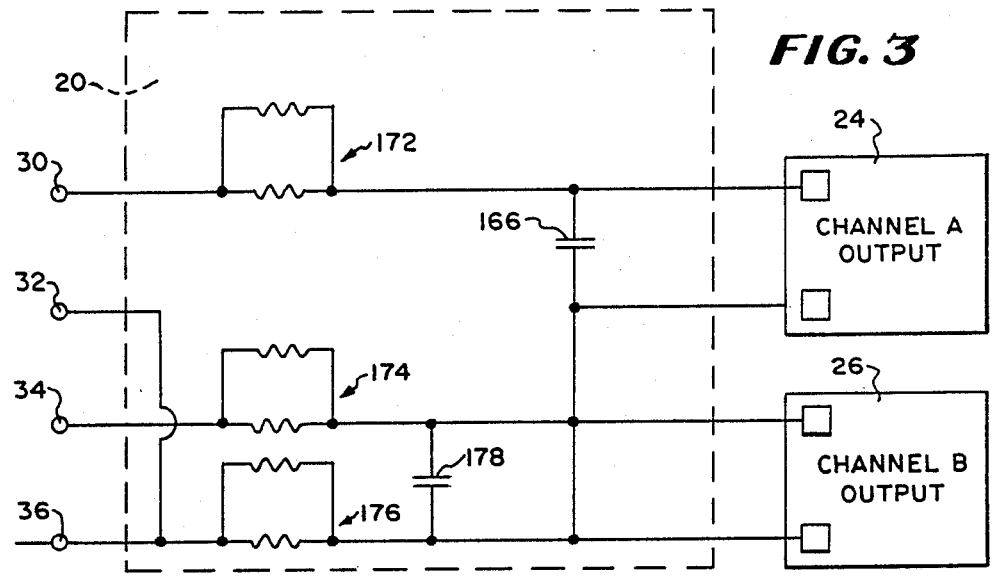

POWER SUPPLY

This application is a continuation, of application Ser. No. 36,308, filed Apr. 9, 1987, now abandoned.

BACKGROUND OF THE INVENTION

This invention relates to power supplies.

In one type of power supply, the output is a high voltage and the power supply selectively maintains constant current, constant voltage or constant power output under the control of a feedback circuit. In such power supplies, the panel controls which may be handled by an operator are insulated from the high-voltage section. Isolation from the high voltage is generally obtained through high resistances, complete high voltage insulation of the low voltage circuitry and a power transformer with high voltage insulation on all of the secondary windings. Some such power supplies provide power to more than one channel.

In the prior art power supplies of this class, there is difficulty in obtaining current feedback for constant current operation and constant power operation. The difficulty occurs because of the need for insulation to meet safety standards between the high-voltage section of the power supply and controls, such as those on microprocessors that are used in some feedback systems. Moreover, some power supplies have multiple outputs and measurements of load current or power in a single output is difficult because the measurement of current or power in only one channel may reduce the feedback current signal and cause the power supply to attempt to compensate.

SUMMARY OF THE INVENTION

Accordingly, it is an object of the invention to provide a novel power supply.

It is a further object of the invention to provide a novel circuit for obtaining feedback from the output of a power supply.

It is a still further object of the invention to provide a novel technique which permits information concerning the output parameters of a power supply to be transmitted from the high-voltage circuit board of the power supply to the low-voltage portion of the power supply.

It is a still further object of the invention to provide a technique which permits a multiple output power supply to provide feedback signals which can accommodate measurements which selectively are of parameters involving all of the outputs or of only certain of the outputs of the power supply.

In accordance with the above and further objects of the invention, power supply circuitry has feedback from its high-voltage section to the low-voltage section to control the output of the power supply. The feedback circuit includes a sensing circuit for obtaining an amplitude modulated signal related to current flowing through at least certain output terminals and a voltage to frequency converter for converting the amplitude modulated signal to a frequency.

To avoid the need for a separate power supply, the voltage to frequency converter has incorporated within it a pulse shaper for generating pulses, have a duration of less than 3 microseconds and supply the pulses to a light emitting diode within the high-voltage section of the power supply circuitry. Light from the diode is transmitted to a low-voltage section where it is utilized in a feedback network. The high-voltage transmitting circuitry and sensing circuitry utilizes less than 75 microamps.

The circuit may be switched from one which senses the total current through multiple output terminals of the power supply or current to only certain sets of the power supply. When switching, certain electrical parameters within the feedback circuit are stored and temporarily utilized to maintain a stable output.

From the above summary, it can be understood that the power supply of this invention has several advantages such as: (1) a relatively-precise current-measuring signal is transmitted from the high-voltage section to the low-voltage section without heavy and expensive insulation of components in the low-voltage section; (2) the circuit for transmitting a signal related to current from the high-voltage section to the low-voltage section is self-powered and utilizes only a small amount of power thus preserving precision; and (3) the feedback circuit functions even though the current being measured is the sum of the currents through different sets of output terminals or the current through only selected sets of output terminals.

DESCRIPTION OF THE DRAWINGS

The above-noted and other features of the invention will be better understood from the following detailed description when considered with reference to the accompanying drawings in which:

FIG. 3 is a schematic circuit diagram of a portion of the filtering circuit of the power supply;

FIG. 4 is a schematic circuit diagram of a voltage to frequency converter utilized in the feedback circuit of the power supply of FIG. 1;

FIG. 5 is a light transmitting circuit which is part of the feedback system for the power supply of FIG. 1;

DETAILED DESCRIPTION

Figure 1:
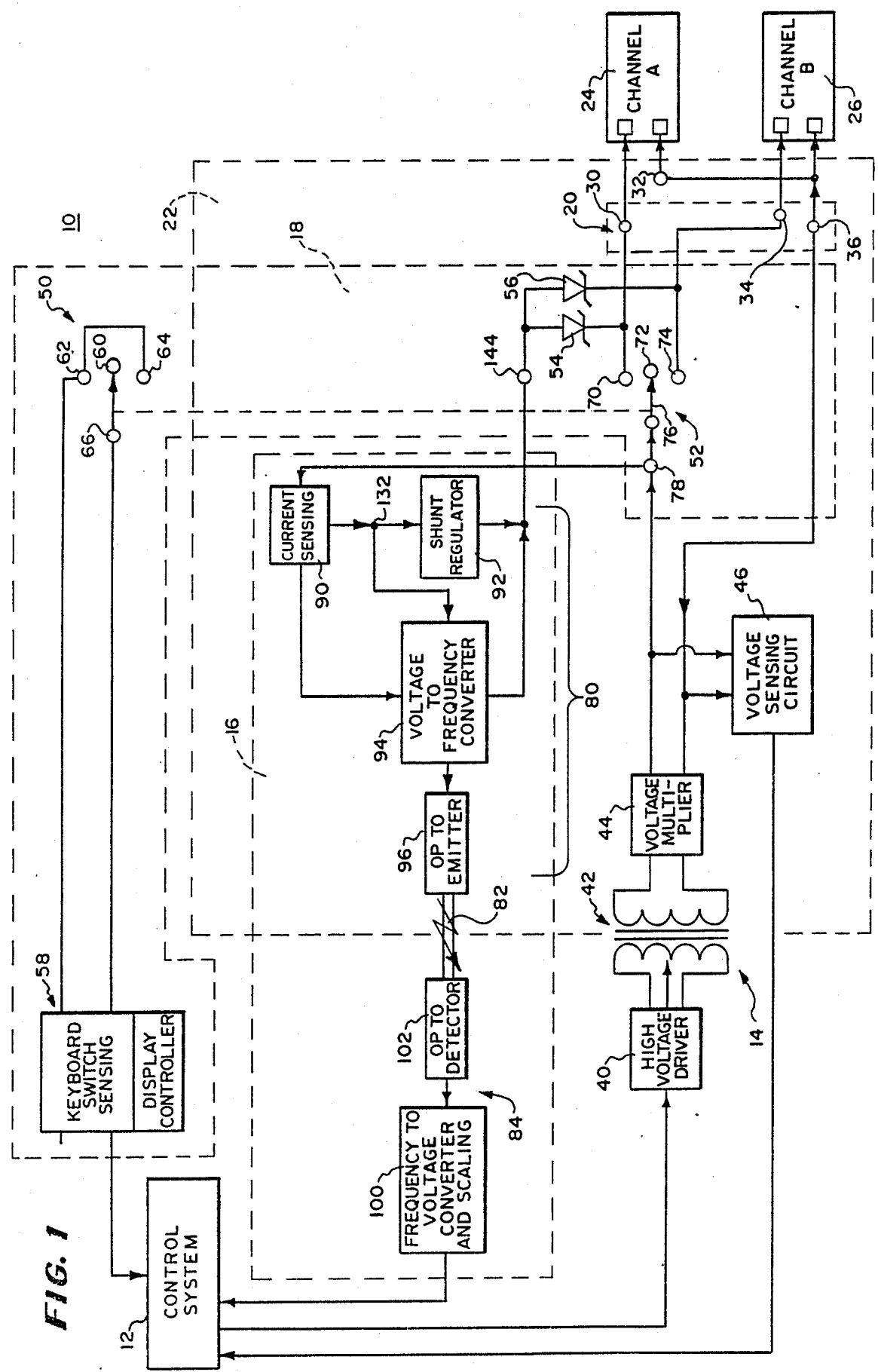
FIG. 1 is a block diagram of a power supply and device being supplied by a power supply in accordance with the invention.

In FIG. 1, there is shown a high-voltage power supply 10 having a control system 12, a voltage output system 14, a current telemetry system 16, a channel switching system 18 and an output terminal system 20. The circuitry has a high-voltage section indicated generally at 22 and a lower voltage section. The high voltage section corresponds to a high voltage circuit board. The lower voltage section includes the control system 12 and portions of the voltage output system 14, current telemetry system 16 and channel switching system 18; and the high-voltage section 22 includes other portions of the voltage output system 14, current telemetry system 16 and channel switching system 18. The high-voltage output terminal system 20 are in the high voltage section 22 portion, which is a separate circuit board insulation from the chassis and low voltage section.

The high-voltage output terminal system 20 is shown electrically connected to first and second electrophoresis apparatuses 24 and 26 for purposes of illustration but the high-voltage power supply 10 may be electrically connected to other apparatuses as well and may be part of other systems which perform other functions.

To provide a high-voltage output, the voltage output system 14 is electrically connected to the control system 12. It is energized by the main power supply and transform the voltage from the mains to a high voltage and converts it to DC on the high-voltage circuit board 22. This high voltage is applied through the high-voltage output terminals 20 to the first and second electrophoresis apparatuses 24 and 26.

To regulate the output of the power supply 10, signals are fed back to the control system 12 indicating output current and voltage. To provide current information and voltage information to the control system 12, the current telemetry system 16 is electrically connected to the channel switching system 18 and to the control system 12 and the voltage output system 14 provides a voltage feedback to the control system 12.

To permit switching that enables the current telemetry system 16 to transmit current information from different terminals in the high-voltage output terminal system 20 relating to different ones of the first and second electrophoresis apparatuses 24 and 26, the channel switching system 18 is electrically connected to the control system 12, the high-voltage output terminals 20 and the voltage output system 14.

The current telemetry system 16 transmits current signals indicating the current flowing through the terminal system 20, from its portion within the high-voltage circuit board 22 to the low voltage portion as a frequency modulated light signal representing the current. It permits the measurement of current from all of the terminals or from only certain ones of the high-voltage output terminals in the terminal system 20 and cooperates with the channel switching system 18 to prevent the change in current being measured from causing voltage changes to maintain constant power output from the power supply or constant current output.

The high-voltage output terminal system 20 includes a first positive potential output terminal 30 and a first negative output terminal 32, a second positive output terminal 34 and a second negative output terminal 36 to form two pairs of positive and negative terminals for energizing the first and second electrophoresis apparatuses 24 and 26. However, more pairs of terminals may be used and the electrical apparatus may be used for purposes other than to energize electrophoresis apparatuses and still incorporate the invention. The high-voltage output terminal 20 includes within it certain filters to be described hereinafter but which are not part of the invention.

To provide high voltage to the output terminals from the secondary distribution mains outlet, the voltage output system 14 includes a high-voltage driver 40, a high-voltage transformer 42, a voltage rectifier-multiplier circuit 44 and a voltage sensing circuit 46. The high-voltage driver 40 supplies alternating current voltage to the primary of the high-voltage transformer 42. The secondary of the high-voltage transformer 42 has its output applied to the voltage rectifier-multiplier circuit 44 which further steps up the voltage and rectifies it, resulting in a DC voltage applied to the high-voltage output terminal system 20.

The high-voltage output system 14 is not part of the invention except insofar as it cooperates with the current telemetry system 16 and the channel switching system 18 and any high-voltage system may be used with routine design changes. In the preferred embodiment the mains power is rectified and used to power a high frequency inverter to supply 30 KHz (kilohertz) power to reduce the size of some components.

To provide regulation of the output, a voltage sensing circuit 46 receives this DC output potential from the voltage multiplier 44 and feeds it back to the control system 12 in the preferred embodiment, but may apply it to the high-voltage driver 40 for certain types of high-voltage drivers which include within them power switches which control the output voltage to the high-voltage transformer 42. A feedback arrangement for controlling power supplies is disclosed in U.S. Pat. No. 3,798,531, granted Mar. 19, 1974 to Isco, Inc. naming Robert W. Allington as the inventor.

The control system 12 includes in the preferred embodiment a microprocessor, analog-to-digital converters for encoding setpoint signals representing voltage and current, circuits for summing the voltage and current operating points and setpoints and a circuit for determining the greater of the error signals which circuit is part of an error amplifier. A microprocessor compares the power to a reference power value preset in memory and supplies signals for altering the voltage output when necessary to achieve constant power operation or other types of operation programmed into the microprocessor. Hardware circuitry may be used instead of the microprocessor and the specific circuits which cooperate with the microprocessor and alternative hardware circuits are described hereinafter.

To permit measurement of current transmitted to one of the plurality of terminals in the high-voltage output terminal circuit 20, the channel switching system 18 includes a single-pole three-throw switch 50, a single-pole three-throw switch 52, a first zener diode 54, a second zener diode 56, and an interface system 58. The single-pole three-throw switch 50 is ganged to the single-pole three-throw switch 52 to permit both switches to be switched at the same time, but always with the single-pole three-throw switch 50 making before single-pole three-throw switch 52 makes, between a position in which all of the current is to be measured, and two other positions—one for each of the two channels disclosed in FIG. 1. The single-pole three-throw switch 52 channels the current that is to be measured through the current telemetry circuit 16 and the single-pole three-throw switch 50 provides the proper coding to the interface system 58.

The interface system 58 communicates with the control system 12 to accommodate the data being transmitted by the current telemetry system 16 depending on the position of the single-pole three-throw switch 50 and the single-pole three-throw switch 52. Of course, where more channels are utilized, switches having a larger number of positions may be used to accomplish the same results.

The single-pole three-throw switch 50 has a first normally closed contact 60, a channel B measuring contact 62 and a channel A measuring contact 64 to provide indications to the interface system 58 indicating that: (1) the sum of the currents through the channels is to be measured; or (2) current through only one channel is to be measured. Channel B contact 62 is electrically connected to channel A contact 64 and directly to the interface system 58 and the pole 66 is electrically connected to the interface system 58. Contact 60 is open.

With this arrangement, when the single-pole three-throw switch 50 is in its normally closed position, the interface system 58 is open circuited at the single-pole three-throw switch 50 to indicate that the sum of the currents is to be measured but when the single-pole three-throw switch 50 is closed to any of the other contacts such as 62 or 64, a circuit is completed to indicate that only one channel is to be measured. Any number of contacts may be used corresponding to any number of channels and if they are electrically connected together the same indication will be provided.

Many other connections may be used other than the ganged single-pole three-throw switches since the only requirement in its simplest form is that there be a difference in the signal provided to the interface system 58 when the sum of the currents is to be measured and when currents through an individual channel are to be measured. For example, in a more sophisticated indications, each contact may be connected to a different code generator to indicate the specific channel which is being measured.

To selectively cause the sum of the currents to flow through the sensing mechanism within the current telemetry system 16 or to cause current only associated with one of the pairs of output terminals in the high-voltage output terminal system 20 to flow through the current telemetry system 16, the single-pole three-throw switch 52 includes a channel B measuring contact 70, a normally closed contact 72 and a channel A measuring contact 74. The common pole 76 is electrically connected to the current telemetry system 16 and to the voltage output circuit 14 at terminal 78 to electrically connect these units to: (1) the normally closed contact 72 when the current through each of the channels is to be added; (2) the channel B measuring contact 70 when only the current through the channel B contact 70 is to be measured; and (3) the channel A measuring contact 74 when only the current through channel A contact 74 is to be measured.

The zener diodes 54 and 56 each have their anode electrically connected to the current telemetry system 16 with first position potential output terminal 30 and the normally open channel B measuring contact 70 being electrically connected to the cathode of the zener diode 54 and the second positive output terminal 34 and normally open channel A measuring contact 74 being electrically connected to the contact of zener diode 56 so that current may flow through the zener diodes 54 and 56 from the current telemetry system 16 into the respective ones of their channels or through one of them to one of the channels during measurement of current.

The first and second negative output terminals 32 and 36 are electrically connected to each other and to the negative electrodes of the electrophoresis apparatus 66 as well as to the negative conductor from the voltage rectifier-multiplier circuit 44. The first and second positive output terminals 30 and 34 are electrically connected to the single-pole three-throw switch 52 and to the current telemetry system 16.

To transmit a signal selectively representing the total current through the output terminals or the current through individual terminals, the current telemetry system 16 includes a high-voltage section 80, a light conductor 82 and a low-voltage section 84. The high-voltage section 80 develops a voltage proportional to the current passing through it and converts this voltage to a frequency which varies as the amplitude of the current.

To transmit the frequency modulated signal to the low-voltage section 84 through an insulator, the frequency modulated voltage is converted to light and transmitted as a frequency modulated light signal through the light conductor 82 to the low-voltage section 84, with the light conductor 82 bridging the high-voltage circuit board 22 containing the high-voltage section 80 and the low-voltage portion of the power supply 10 to provide insulation between the two. The low-voltage portion 84 converts the frequency modulated light to an amplitude modulated voltage for application to the control system 12 which utilizes the information for calculations involving current flow through the output terminals.

To generate the frequency modulated light signal representing current, the high-voltage section 80 of the current telemetry system 16 includes a current sensing circuit 90, a shunt regulator 92, a voltage-to-frequency converter 94 and an optical-emitter 96. The current sensing circuit 90 is electrically connected to terminal 78 to receive current and provide a voltage proportion to the current to the voltage-to-frequency converter 94 to which it is electrically connected.

The output of the voltage-to-frequency converter 94 is electrically connected to the optical-emitter 96 which generates a pulse of light in response to the oscillating output of the voltage-to-frequency converter 94 so that light is provided to the light conductor 82 by the optical-emitter 96 at a frequency that varies in proportion to the current flow through the light telemetry system 16.

The voltage regulator 92 maintains the appropriate voltage of 5 volts across the voltage-to-frequency converter 94. Current flowing through the voltage regulator 92 flows through the zener diodes 54 and 56 to the output terminals. With this arrangement, no separate power is needed for the current telemetry system 16 to transmit a signal through the light conductor 82 from the high-voltage section of the power supply 10 to the low-voltage section.

In the preferred embodiment, the light conductor 82 is 3 feet in length but its length only needs be sufficient to stretch between the light emitting diode and the sensing circuit 84 which converts the frequency modulated light signals to amplitude modulated voltage signals. It must have sufficient resistance to avoid flashover and a bandwidth sufficient to provide a sufficient range for the measurement of current as a practical matter its length should be at least 3 inches long.

The low-voltage section 84 includes a frequency-to-voltage converter 100 and an optical detector 102. The optical detector 102 is coupled to the light conductor 82 to receive light signals therefrom and convert them to electrical signals. Its output is electrically connected to the frequency-to-voltage converter 100 which develops an analog voltage which varies in amplitude in proportion to the frequency of the signal for application to the control system 12.

Figure 2:
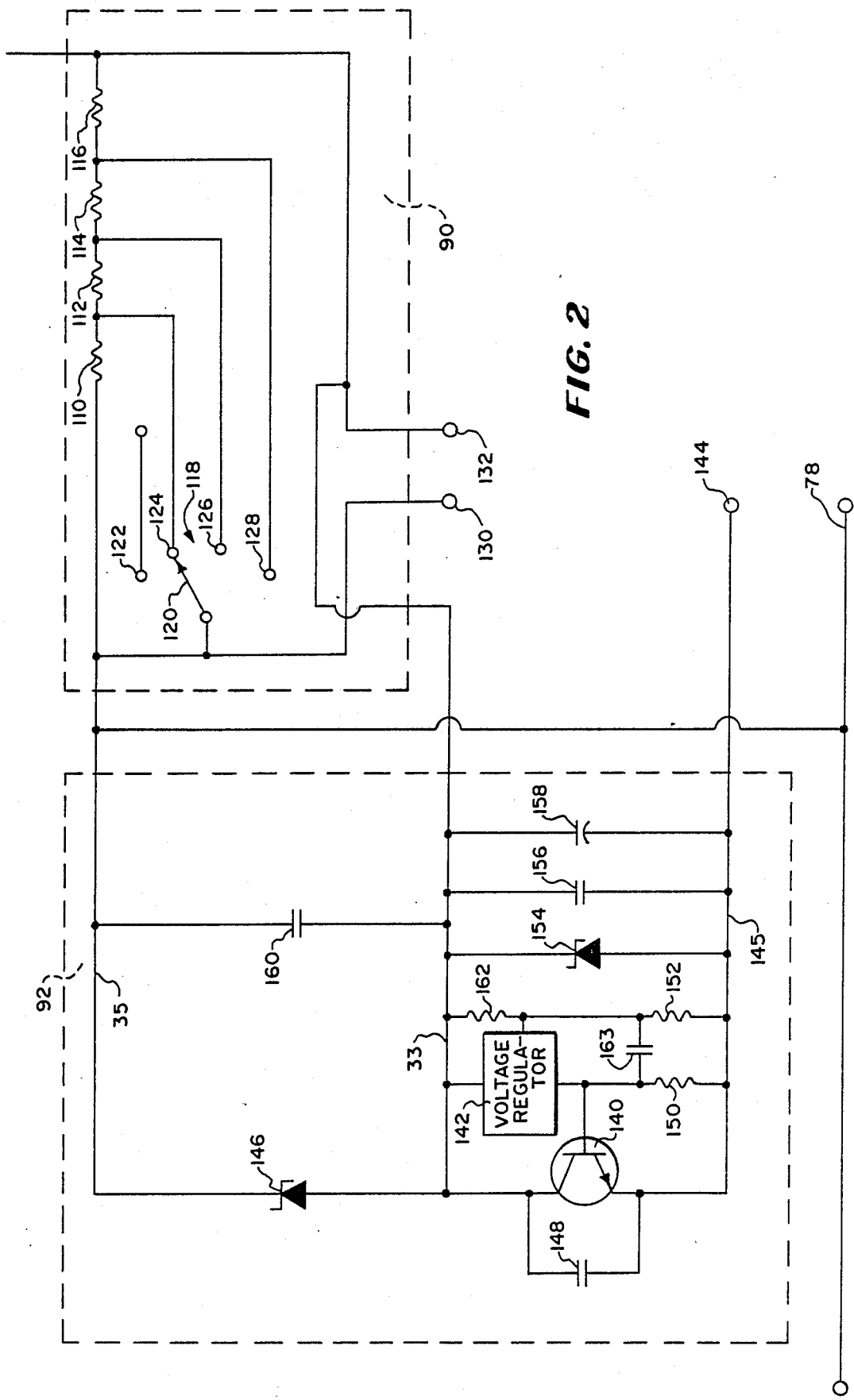
FIG. 2 is a schematic circuit diagram of a current sensing section utilized in a feedback loop which is part of the power supply of FIG. 1.

In FIG. 2, there is shown a schematic circuit diagram of the current sensing circuit 90 and the shunt regulator circuit 92. Current flows from the positive voltage terminal 78 (FIG. 1) of the high-voltage portion of the power supply 10 through the current sensing circuit 90 and then through the shunt regulator circuit 92 to the positive output terminals and then returns to the negative high-voltage conductor, with the current sensing circuit 90 and the shunt regulator circuit 92 establishing potential at its output terminal for connection to the voltage-to-frequency converter 94 (FIG. 1).

To provide an electrical potential proportional to the current flowing through the current sensing circuit 90, the current sensing circuit includes a first 750 ohm resistor 110, a 150 ohm resistor 112, a 75 ohm resistor 114, a 25 ohm resistor 116, and a single-pole four-position range switch 118. To generate a voltage proportional to the current being measured and related to the range of current being supplied to the output, the single-pole four-position range switch 118 is positioned for the appropriate range for current to be transmitted through the electrophoresis apparatuses 24 and 26.

The common contact or pole 120 of the single-pole four-position range switch 118 is electrically connected to terminal 78 at the positive output terminal of the voltage rectifier-multiplier circuit 44 (FIG. 1) and includes four contacts 122, 124, 126 and 128. Contact 122 is open and contacts 124, 126 and 128 are respectively electrically connected between the: (1) 750 ohm resistor 110 and 150 ohm resistor 112; (2) 150 ohm resistor 112 and 75 ohm resistor 114; and (3) 75 ohm resistor 114 and 25 ohm resistor 116.

To provide a signal representing current amplitude to the voltage-to-frequency converter 94 (FIG. 1), the output terminal 132 is electrically connected to 75 ohm resistor 116 and to the shunt regulator circuit 92 and the output terminal 130 is electrically connected to terminal 78 so that current flowing through the terminal 78 may follow any of several paths in proportions related to the position of the common electrical contact 120 through (1) selected one of the contacts 124, 126 or 128 and the resistors between it and output terminal 132 or the shunt regulator circuit 92; (2) through the 750 ohm resistor 110, 150 ohm resistor 112, 75 ohm resistor 114, and 25 ohm resistor 116 in series to output terminal 132 or the shunt regulator circuit 92; and (3) directly to the output terminal 130.

With this arrangement, the voltage drop between output terminals 130 and 132 is controlled by the amount of current flowing through the current sensing circuit 90 and the selected current range determined by the position of the movable switch arm 120 of the single-pole four-position switch 118. This potential is applied to the voltage-to-frequency converter 94 (FIG. 1).

To provide a regulated voltage to output terminal 132 and to the voltage-to-frequency converter 94 (FIG. 1), the voltage regulator circuit 92 includes a 2N3053 NPN transistor 140, and a LM385Z solid-state voltage regulator 142. The solid-state voltage regulator 142 is electrically connected across output terminal 132 through conductor 133 and terminal 144 through a 1 K (kilohm) resistor 150 and a conductor 145 in that order, which terminal 144 is electrically connected to the anodes of the zener diodes 54 and 56 (FIG. 1). To provide voltage regulation, the NPN transistor 140 has its collector electrically connected to conductor 33 and its emitter to conductor 145.

For filtering and voltage protection, conductors 33 and 145 are electrically connected to opposite plates of: (1) a 0.33 uf (microfarad) capacitor 148; (2) a 0.22 uf capacitor 156; and (3) a 10 uf capacitor 158. A zener diode 154 has its cathode connected to conductor 33 and its anode connected to conductor 145.

To bias the regulator 142, the control electrode is electrically connected to conductor 33 through a 121 K resistor 162 and to conductor 145 through a 355 K resistor 152. A 0.33 uf capacitor 163 connected between the control electrode of the regulator 142, the base of transistor 140 and the output of regulator 142 prevents regulator 142 from being disturbed by electrical noise.

To prevent sudden voltage spikes from being sensed by the voltage-to-frequency converter 94 (FIG. 1), conductor 33 and a conductor 35, which are connected to terminals 78 and 130, are connected by a 0.1 uf capacitor 160 and a zener diode 146, the zener diode 146 being connected with its anode electrically connected to conductor 33 and its cathode to conductor 35.

In FIG. 3, there is shown a schematic circuit diagram of the output terminal system 20 and first and second electrophoresis apparatuses 24 and 26 connected to receive output voltage from the output terminal system 20. The output terminal system 20 receives a positive potential from the voltage rectifier-multiplier circuit 44 on the first and second positive potential output terminals 30 and 34 and applies that potential through filter circuits 172 and 174. Similarly, first and second negative output terminals 32 and 36 receive a negative potential from the voltage rectifier-multiplier circuit 44 (FIG. 1) with terminal 36 being electrically connected to first negative output terminal 32 and applying the signal through the filter circuit 176.

The output of the filter circuits 174 and 176 are each electrically connected to different plates of a 0.0033 uf capacitor 178 and the outputs of the lc filter circuits 172 and 176 are electrically connected through a similar capacitor 180. The output of the filter circuit 176 is electrically connected to the negative terminal of each of the first and second electrophoresis apparatuses 24 and 26 and the outputs of the filter circuits 172 and 174 are each electrically connected to a corresponding one of the first and second electrophoresis apparatuses 24 and 26. Each of the filter circuits 172, 174 and 176 includes a 780 uH (microhenry) capacitor and a 1 K ohm resistor electrically connected in parallel. The filter circuits are conventional filtering circuits for the output of the power supply to prevent radio frequency interference from the high voltage driver 40 and transformer 40 (FIG. 1) from being transmitted through the output terminals 30, 32, 34 and 36 (FIG. 1).

In FIG. 4, there is shown a schematic circuit diagram of the voltage-to-frequency converter circuit 94 which receives a voltage across output terminals 130 and 132 representing the current flow through the current telemetry circuit 16. The supply terminal 132 is maintained at positive 5 volts by the shunt regulator circuit 92 (FIGS. 1 and 2) and input terminal 130 is varied in potential by the current sensing circuit 90 (FIGS. 1 and 2).

The voltage-to-frequency converter 94 includes a temperature compensation signal development circuit 190, a voltage-to-frequency converter 192, a pulse shaper 194 and an output NPN transistor 196. The temperature compensation signal development circuit 190 includes a 1 M (megaohm) resistor 200, a 30K temperature-compensation negative temperature coefficient resistor 202; a 499 K resistor 204 and a 470 pf (picofarad) capacitor 206. The 1 M resistor 200, the 30K temperature compensation negative temperature coefficient resistor 202 and the 499K resistor 204 provide a voltage divider to the input of the voltage-to-frequency converter 192 which is electrically connected between the 1 M resistor 200 and the 30 K temperature compensation negative temperature coefficient resistor 202. The 470 pf capacitor 206 shunts transients to ground at terminal 144.

The voltage-to-frequency converter 192 may be any conventional low-power voltage-to-frequency converter but in the preferred embodiment is one which is incorporated in a 4046 phase lock loop integrated circuit sold by Motorola Semiconductor Division. It receives a regulated 5 volts from output terminal 132 on pins 14 and 16, with the input signal being received on pin 9. Its output is connected through pin 4 to the pulse shaper 194 with pins 6 and 7 being connected to opposite plates of the 750 pf 1 c capacitor, pin 11 being connected to terminal 144 and pins 3, 5 and 8 being connected to terminal 144.

To shape the pulses from voltage-to-frequency converter 192, the pulse shaper 194 is a CMOS R-S flip-flop configured as a generator of approximately 1 microsecond pulses by the microsecond time constant circuit formed by the RC circuit that includes the 10 K resistor 210 and 100 pf capacitor 1 c 212 connected in series. The flip-flop in the preferred embodiment is a flip-flop sold by Motorola Semiconductor Division under the designation 4013B.

To provide short duration pulses, the flip flop 194 receives a 5 volt control voltage from output terminal 132 on pin 14, and input pulses from the voltage-to-frequency converter 192 on pin 3. It has a 10 K resistor 210 electrically connected across pins 1 and 4, pins 6 and 7 connected to terminal 144, and pin 4 connected through the 100 pf (picofarad) capacitor 212 to terminal 144. The output on pin 1 is electrically connected across a 10 K resistor 214 and a 2.7 K resistor 216 to terminal 144 with the base of the output transistor 196 being electrically connected between the 10 K resistor 214 and the 2.7 K resistor 216.

To provide output pulses to the optical-emitter 96, the transistor 196 has its base electrically connected between the 10K resistor 214 and the 2.7K resistor 216, its collector electrically connected through a 180 ohm resistor 220 to terminal 172 and its emitter electrically connected to terminal 144. The output transistor 196 is a 2N3904 NPN transistor.

In FIG. 5, there is shown a schematic diagram of the light conductor 82, the optical-emitter 96 and the optical detector 102 arranged to generate pulses of light, transmits them from the optical-emitter 96 through the light conductor 82 to the optical detector 102 for detection at terminal 210 which is electrically connected to the frequency-to-voltage converter 100 (FIG. 1). The optical-emitter 96 is a light emitting diode of type MFO-E71 manufactured and sold by Motorola Corporation. The 1 microsecond pulses applied to terminal 172 cause a light pulse to be emitted and transmitted through the light conductor 82 and received by the Motorola Corporation MFOD72 detector 102. The detector 102 is electrically connected at its collector to a source of positive 15 volts and has its emitter electrically connected to output terminal 210 and to ground through a 10 K resistor 212.

Figure 6:
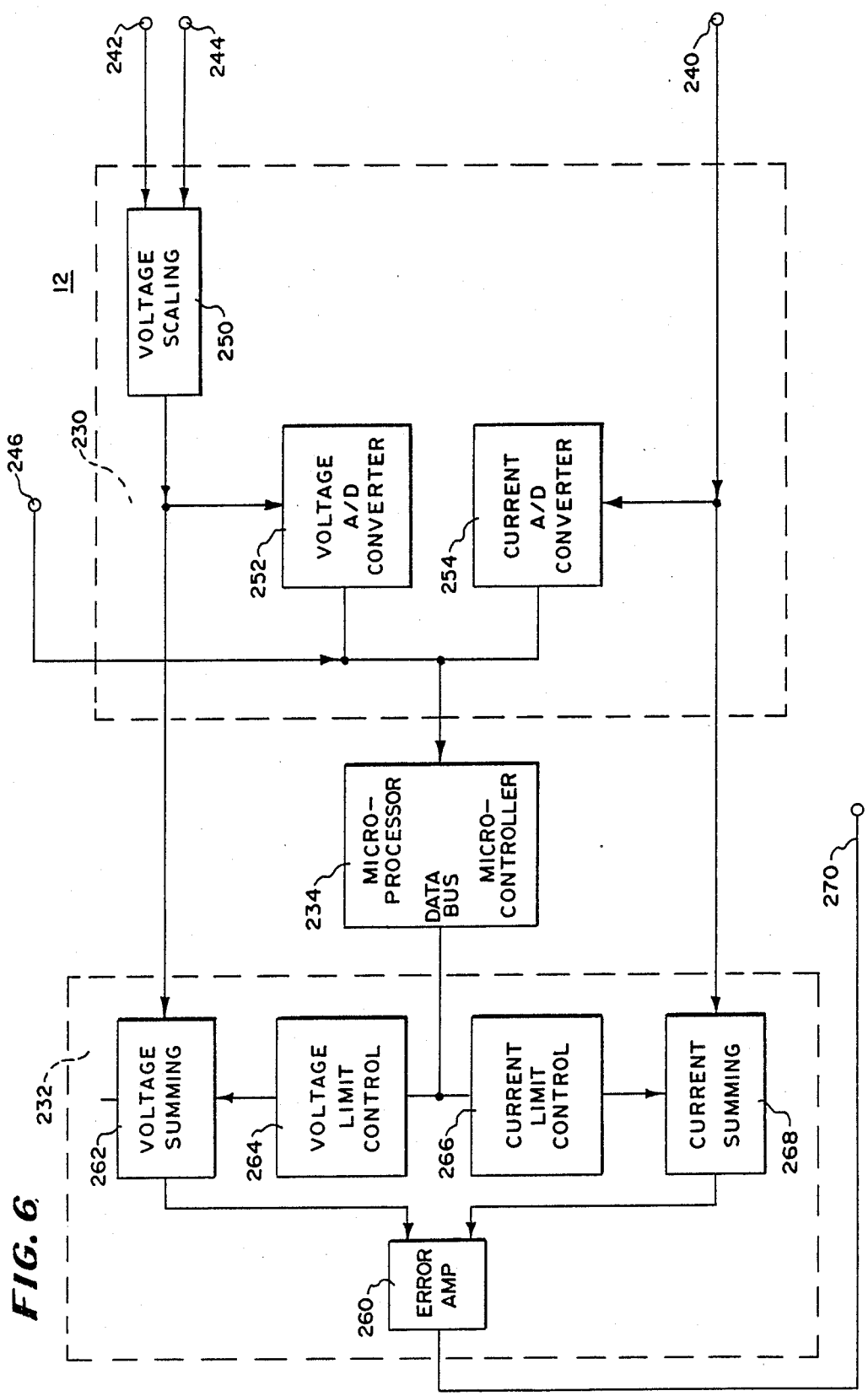
FIG. 6 is a block diagram of a controller for controlling the output of the power supply in accordance with certain feedback signals and set parameters.

In FIG. 6, there is shown a block diagram of the control system 12 having an output system 232, a microprocessor 234 and an input system 230. The input system 230 receives signals indicating measurements of voltage, current and data entered into it by an operator and supplies signals to the microprocessor 234 and to the output circuit 232. The output circuit 232 compares signals received from the input circuit 230 with information from the microprocessor 234 and generates an error signal to serve as feedback to the power supply in response thereto.

To receive data, the input circuit 230 is electrically connected: (1) at terminal 240 to the output of the frequency-to-voltage converter 100 (FIG. 1) from which it receives an analog voltage indicating the current that has been measured; and (2) to terminals 242 and 244 to receive signals indicating measured output voltage supplied by the voltage sensing circuit 46 (FIG. 1) and data entered into a keyboard on terminal 246 from the interface system 58. Keyboard data may indicate parameters such as current limits or the like decided upon by the user.

The input circuit 230 includes a voltage scale switch 250, a voltage analog-to-digital converter 252 and a current analog-to-digital converter 254. The voltage scale switch 250 receives voltage signals and scales them for the proper range, applying the signals to the voltage analog-to-digital converter 252 and to the output circuit 232.

The current analog-to-digital converter 254 receives the analog signals indicating current on conductor 240 and converts them to a digital signal. They are transmitted to the microprocessor 234. The microprocessor 234 is electrically connected through a data bus to the input circuit 230 to receive: (1) digital signals indicating voltage, current and power limits received on terminal 246 from an operator; and (2) the measured values such as output voltage and output currents in digital form. These signals are supplied by the microprocessor 234 to the output circuit 232.

The output circuit 232 includes an error amplifier 260, a voltage summing circuit 262, a voltage-limit or setpoint control digital-to-analog converter 264, a current limit or setpoint control digital-to-analog convertor 266 and a current summing circuit 268. The microprocessor 234 provides the preset voltage, current and power values which are set into it through the keyboard at terminal 246. An exception is when current or power is being measured in only one of the output channels in which case the stored value is one corresponding to the output voltage just before the one channel measurement was made. These values are stored as static voltages in the corresponding voltage limit control digital-to-analog converter and current limit control digital-to-analog converter.

The microprocessor is able to calculate the power output from the product of the voltage and current received by it in digital form from the analog-to-digital convertors 252 and 254. The microprocessor determines whether the power output exceeds the preset power output. If it is so exceeded, the microprocessor lowers the voltage limit setpoint until the power is not excessive. If the power output is too low it raises the voltage setpoint but not to a greater value than the programmed voltage limit.

The static voltages representing voltage and power limits are applied to the voltage summing circuit 262 and the static voltage representing current limits are applied to the current summing circuit 268 from the voltage limit and current limit digital-to-analog converter 264 and 268, respectively. The voltage summing circuit 262 and current summing circuit 268 compare these values to the measured values and apply error signals to the error amplifier 260. The error amplifier 260 controls high-voltage driver 40 through conductor 270 and this regulates the output of the power supply.

Figure 7:
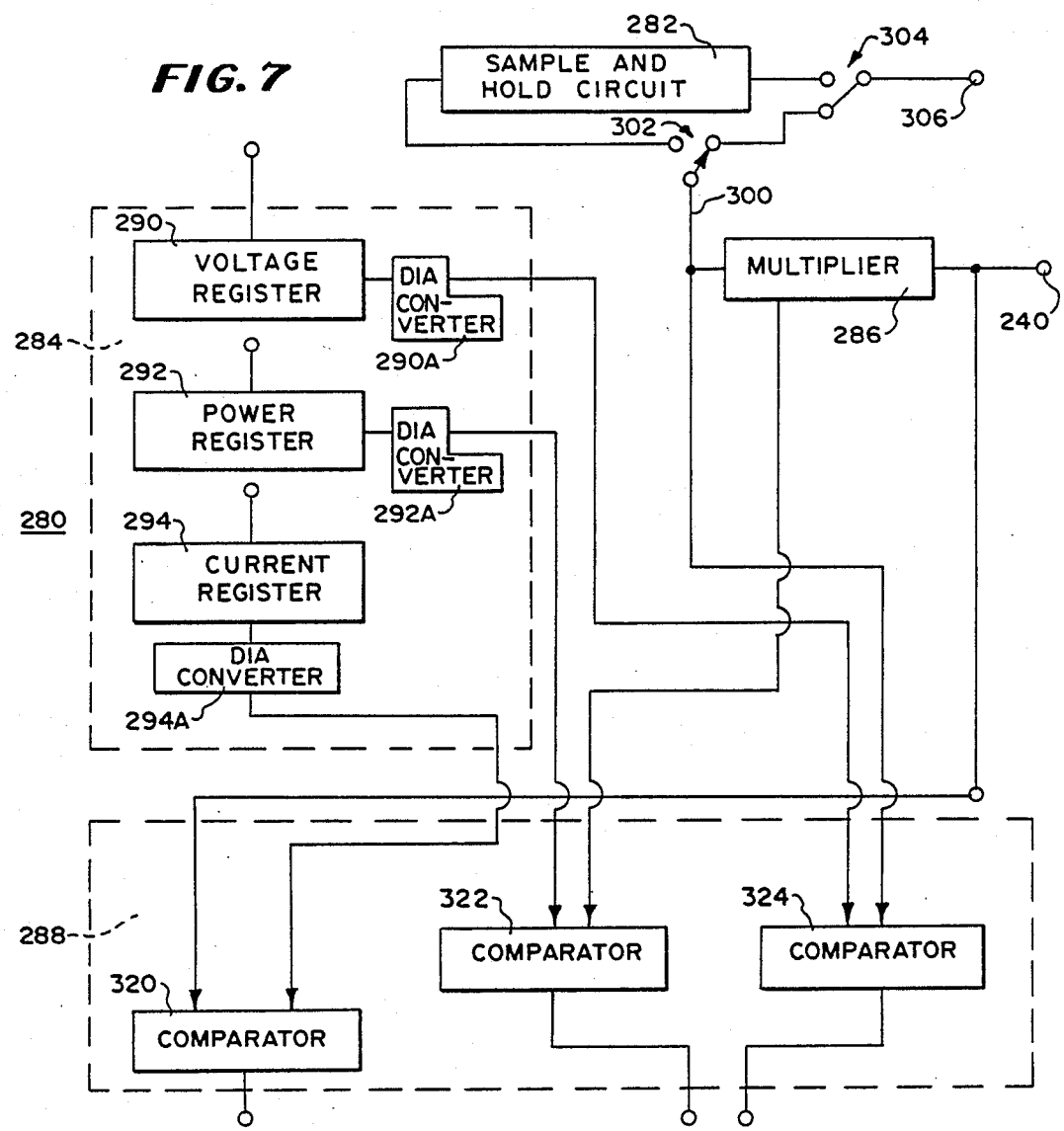
FIG. 7 is an alternative embodiment of a controller.

In FIG. 7, there is shown another embodiment of control system 280 for performing some of the functions of the control system 12 having a sample and hold circuit 282, a memory circuit 284, a multiplier 286, and a comparator circuit 288.

The comparator circuit 288 receives (1) stored values of power, current and voltage; and (2) measured values and calculated values which may also be of voltage, current and power. It compares the stored values and measured or calculated values for application to the error amplifier 260 (FIG. 6).

To establish set point values for voltage-output, current-output, or power-output limits, the memory circuit 284 includes a voltage register 290, a power register 292, and a current register 294 each adapted to receive a signal on a respective conductor from the keyboard entry system 58. Each of the registers includes a corresponding one of the digital-to-analog convertors 290A, 292A, and 294A connected to its output. The digital-to-analog convertors each are connected to the comparator circuit 288.

To calculate power, a multiplier 286 has one input electrically connected to terminal 240 to receive a current value, another input electrically connected to receive a voltage value, and has its output electrically connected to the comparator circuit 288.

To apply a voltage value to the multiplier 286, the voltage input of the multiplier 286 is electrically connected to a conductor 300. Conductor 300 is also electrically connected to the comparator network 288 and to the common pole of a single-pole two-throw switch 302, one pole of which is connected to the output of the sample and hold circuit 282 and the other of which is electrically connected to the normally closed contact of a single-pole double-throw switch 304. The common contact of the switch 304 is electrically connected to terminal 306 to receive signals representing the output potential of the power supply.

With the switches in their normally closed position, the multiplier 286 receives the voltage directly from the output of the power supply through the voltage sensing circuit 46. The multiplier multiplies this value by current to provide a power output value to the memory circuit 288.

When the switches 302 and 304 are closed to their normally open contact, the sample and hold circuit 282 stores the read value and applies it to the multiplier and to the comparator circuit so that a constant voltage may be maintained during a time that the user is measuring current or voltage in a particular electrophoresis channel.

To compare the set point voltage, current and power, the comparator circuit 388 includes a current comparator 320, a power comparator 322, and a voltage comparator 324, each having an output electrically connected to the error amplifier 260 (FIG. 6) to compare set point values with measured and calculated values except in the case where the switching network 18 is switched to a single channel. When the switching network 18 is switched to a single channel, the circuit operates as a constant voltage circuit using the last read value of output potential of the power supply and thus holds its output parameters constant.

Each of the comparators receives at its input a corresponding stored set point voltage and measured voltage or a stored set point power and measured power. The outputs of the comparators are transmitted to the error amplifier 260 (FIG. 6) and used to control the output parameters of the power supply.

Figure 8:
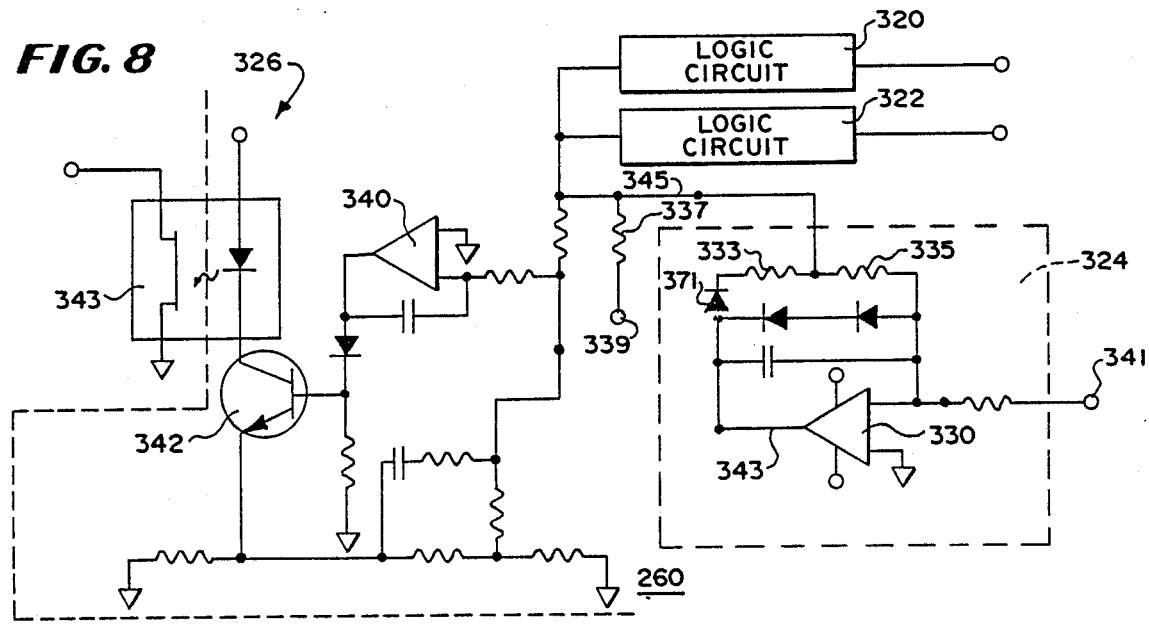
FIG. 8 is a schematic circuit diagram of a portion of the feedback circuit of FIG. 1.

In FIG. 8, there is shown a schematic circuit diagram of the error amplifier circuit 260 having a current logic circuit 320, a voltage logic circuit 322, and a power logic circuit 324 each electrically connected to an amplifier circuit 326. The logic circuits are electrically connected to the outputs of the voltage summing or current summing amplifiers or of the comparators in the embodiments of FIGS. 6 and 7 respectively.

The logic circuits are substantially the same in structure and differ from each other in accordance with their inputs and outputs. For the purpose of simplifying the disclosure only one is shown in detail. They each conduct a different error signal either based upon a setpoint or limit selected by the microprocessor in the embodiment of FIG. 6 or by the operator in the embodiment of FIG. 7 and amplify that error signal so as to control the power supply in accordance with a selected one of constant current, constant voltage or constant power. The selection is accomplished by the logic circuits 320, 322 and 324. The terms constant current, constant voltage or constant power means that the current, voltage or power respectively are controlled by a set point but does not preclude the set point varying in accordance with a programmed sequence.

Each of the logic circuits includes an operational amplifier such as operational amplifier 330 and passive logic elements composed of diode 331 and resistors 333 and 337. A negative 15 volts at lead 339 develops a current through resistor 337 which is of such polarity to cause the output of the power supply to increase. Assuming that logic circuit 324 senses this increase before the other two logic circuits, the output 343 of operational amplifier 330 goes positive, turning on diode 331.

Positive current through diode 331 and resistor 333 counters the negative current through resistor 339, bringing the power supply under the regulation of the parameter corresponding to the error signal on lead 341. The voltage drop of diode 331 contributes no error since the analog output on 345 is subject to negative feedback from resistor 335 connected to the inverting input of the operational amplifier. The current logic circuit 320 and voltage logic circuit work in the same manner. Selection automatically takes place on the lowest (first) limit which is exceeded.

The amplifier circuit 326 includes the operational amplifier 340, an output amplifier which is a 2N3053 NPN transistor 342 and an optical isolator 343. The output of the optical isolator is electrically connected to the high-voltage driver 40 to control the time period that the switch is open in that driver and thus the output voltage. The operational amplifier 340 is conventional and has its output connected to drive the transistor 342 which, in turn, drives the opto-isolator 345. This circuit is conventional and not part of the invention except to the extent is cooperates with the switching circuit 18 or the current transmission circuit 16.

In the operation of the circuit, the operator may elect to have a constant voltage output, a constant current or a constant power output to the electrophoresis channels 24 and 26. Commonly, a constant voltage output is provided to establish constant migration except that the power is monitored and when it reaches a limit, then power is controlled. These limits may all be set in the microprocessor or hardware registers depending on the embodiment although a microprocessor control is more suitable for the operation of the circuit.

During operation of the circuit, feedback from the high-voltage circuit board to the low-voltage circuit board necessary to control operation and maintain the selected parameter constant or control a switching from one constant parameter to another such as from constant voltage to constant power is controlled by a light telemetry unit 16. This unit in conjunction with a switching circuit 18 is able to measure either the current through a single pair of output terminals or the sum of the currents through all of the output terminals. Voltage is also measured but the voltage measurement in transmission is not part of this invention except insofar as it cooperates with the switching circuit and current measurements to determine power.

Voltage is sensed and transmitted from the high-voltage circuit board 22 to the low-voltage circuit board for use by the microprocessor through a high impedance so as to meet safety standards. Because of the small amount of power available to supply current information, the inaccuracies due to attenuation through a resistance are unacceptable and so a special transmitting circuit is utilized.

With this special transmitting circuit, the current to be measured is channeled through a resistor sensor and a voltage is received to represent the current that is flowing to the output circuit to be measured. This voltage is converted by voltage-to-frequency convertor which generates pulses which are applied to an optical emitter circuit. The voltage-to-frequency convertor and optical emitter use less than 75 microamps of current when operating.

The voltage-to-frequency convertor includes a pulse shaper which provides an output pulse of less than 3 microseconds and with this output pulse, the light emitting diode operating on such short pulses requires a small enough amount of average power so that the circuit can be self-powered and thus not require an additional power source for the telemetry operation on the high-voltage circuit board.

To permit measurement of current flow through a single channel of multiple channels, the current through the channels not being measured bypasses the light telemetry unit and is not sensed. To avoid the feedback circuit recognizing a lower current and attempting to adjust the voltage to provide the constant power or constant current output when current is bypassed so as to sense only the current through a single channel, the voltage just before current bypassing is stored in a sample-and-hold circuit or in a microprocessor memory. The value stored in the microprocessor memory or in the sample and hold circuit is used by the power supply which switches to a constant voltage operation mode until the circuit returns to its normal mode of operation in which all of the current being applied to any channel passes through the light telemetry unit.

While a proposed hardware circuit has been shown as a part of the control system 12 (FIG. 1), in the preferred embodiment the control system 12 is partly software and partly hardware. An Intel 80C39 micro-controller is used with appropriate software to generate the digital signals controlling the voltage and current limit controls to maintain constant power, current or voltage as described above. The software program relevant to these functions is summarized below and then given in full and contains a program to perform the same functions as shown in the proposed hardware schematics.

When switching to a measurement of an individual channel is detected, the program checks to determine if it is in the individual channel mode or not. If it is not in that mode, then it sets the channel mode, recalls the last voltage measured and sends it out to the voltage digital-to-analog converter. It sets an indicator to voltage to show that the power supply is operating in a constant voltage mode while waiting for release of the channel.

After sensing release of the channel switch, it again determines if it is in the channel mode for current measurement in one channel or the mode for sensing all current. If it is in the mode for sensing current in one channel, it resets it counter for steps in the program (CHNLCT) to zero and proceeds again through the loop.

If the channel switch is released and the sensor, upon being checked by the microprocessor, indicates the switches are set in the normal mode for measurement of all current after exiting the individual channel mode, then the CHNLCT counter is set to five and B7 is set. B7 tells the countdown in progress and sets the keyboard to normally scan the keys. It returns to the main loop, the main loop decrements CHNLCT counter to zero in five seconds to allow the total current to stabilize and then takes the unit out of the single channel mode. As a result, the current and voltage limits are then updated once each second automatically by the system.

As can be understood from the above description, the power supply of this invention has several advantages such as: (1) it permits current to be measured in the power supply without the use of auxiliary sources of power or special insulating measures to meet safety standards for current supply from the high-voltage circuit board to the low-voltage circuit board which contains indicators and controls; (2) it permits current measurement in a single channel of a plurality of channels without causing the feedback control power supply to react improperly; and (3) the telemetry unit for current values from the high-voltage circuit board to the low-voltage control section permits high accuracy across a wide range of currents while using only power that is being applied to the output terminals to energize the telemetry unit.

Although a preferred embodiment of the invention has been described in some particularity, many other modifications and variations of the preferred embodiment are possible without deviating from the invention. Therefore, it is to be understood that, within the scope of the appended claims, the invention may be practiced other than as specifically described. The program follows this specification before the claims as separate pages.

What is claimed is:

1. Electrical apparatus having within it a measuring means for measuring electrical current, said electrical apparatus being included in a power supply having means adapted to receive power from a mains source of power, comprising:
   means for sensing said current and generating a voltage signal representing said current;
   voltage-to-frequency conversion means for converting said voltage signal to a signal which varies in frequency in a manner related to the variations in amplitude of said voltage signal;
   optical means for converting said voltage-to-frequency signal to a light signal;
   light transmission means for transmitting said light signal from said optical means;
   optical receiver means for receiving said light being transmitted through said light transmission means and converting it to an electrical signal;
   means for utilizing the electrical signal for control purposes within said apparatus;

a high-voltage section and a low-voltage section;
said light transmission means including a light conductor extending between said high voltage section and said low-voltage section;
said light conductor having a length of at least two inches and being insulative, whereby the portions of said current measuring circuit in said low-voltage portion may be freed from the amount of insulation required by portions on the high-voltage section;
said voltage-to-frequency conversion means including means for generating variable frequency electrical pulses having a pulse duration of less than 3 microseconds; said pulse durations being 1 microsecond;
said voltage-to-frequency conversion means and optical means comprising means for causing said current being measured to energize said light transmission means for transmitting said light signal;
a plurality of channels for receiving electrical power;
current transmitting means having a first transmitting position and a plurality of selectable other transmitting positions for transmitting current flowing through all of said channels through said means for sensing said current when in said first transmitting position, whereby the sum of all the currents flowing through all of the channels is measured and for transmitting current to at least one selected channel without flowing through said means for sensing current, whereby said means for transmitting light transmits a signal representing current flowing through less than the totality of channels;
switching means for selecting one of said first and other transmitting positions;
said switching means including means for providing an indication of the channel, the current of which is being measured;
said switching means including means for causing at least some current to bypass said measuring means;
said means for bypassing including means for indicating when the totality of the current flowing through said plurality of channels is being measured;
said electrical apparatus being included in a power supply having means adapted to receive power from a mains source of power; and
switch means for electrically connecting a source of mains potential directly to one channel without passing through said optical transmitting means and electrically connecting other channels through said measuring means of said optical transmitting means.

2. Electrical apparatus in accordance with claim 1 in which said high-voltage portion of said light transmitting circuit requires no more than 75 microamps of current to operate.

3. Electrical apparatus in accordance with claim 2 in which said voltage-to-frequency converter includes pulse shaping means for providing an output pulse having a pulse duration of less than 3 microseconds and said means for generating light pulses includes a light-emitting diode.

4. Electrical apparatus in accordance with claim 3 in which said voltage-to-frequency converter includes pulse shaping means for providing an output pulse having a pulse duration of less than 3 microseconds and said means for generating light pulses includes a light-emitting diode.

5. Electrical apparatus in accordance with claim 1 in which said means for bypassing at least some of said channels includes:
said electrical apparatus being included in a power supply having means adapted to receive power from a mains source of power; and
switch means for electrically connecting a source of mains potential directly to one channel without passing through said optical transmitting means and electrically connecting other channels through said measuring means of said optical transmitting means.

6. Electrical apparatus in accordance with claim 5 in which said high-voltage portion of said light transmitting circuit requires no more than 75 microamps of current to operate.

7. Electrical apparatus in accordance with claim 6 in which said voltage-to-frequency converter includes pulse shaping means for providing an output pulse having a pulse duration of less than 3 microseconds and said means for generating light pulses includes a light-emitting diode.

8. Electrical apparatus in accordance with claim 1 in which said means for bypassing at least some of said channels includes:
said electrical apparatus being included in a power supply having means adapted to receive power from a mains source of power; and
switch means for electrically connecting a source of mains potential directly to one channel without passing through said optical transmitting means and electrically connecting other channels through said measuring means of said optical transmitting means.

9. Electrical apparatus in accordance with claim 8 in which said high-voltage portion of said light transmitting circuit requires no more than 75 microamps of current to operate.

10. Electrical apparatus having within it a measuring means for measuring electrical current, comprising:
means for sensing said current and generating a voltage signal representing said current;
voltage-to-frequency conversion means for converting said voltage signal to a signal which varies in frequency in a manner related to the variations in amplitude of said voltage signal;
optical means for converting said voltage-to-frequency signal to a light signal;
light transmission means for transmitting said light signal from said optical means;
optical receiver means for receiving said light being transmitted through said light transmission means and converting it to an electrical signal;
means for utilizing the electrical signal for control purposes within said electrical apparatus;
said light transmission means including a light conductor for transmitting said light;
said light conductor having a length of at least two inches and being insulative;
said voltage-to-frequency conversion means including means for generating variable frequency electrical pulses having a pulse duration of less than 3 microseconds;
said voltage-to-frequency conversion means and said optical means comprising means for causing said current being measured to energize said light transmission means for transmitting said light signal;

said electrical apparatus including a high voltage portion and a low voltage portion;

a transformer having a low voltage primary winding and a high voltage secondary winding;

means for applying an electrical current to said low voltage primary winding under the control of said means for utilizing the electrical signal for control purposes within said electrical apparatus wherein the current through said primary winding is controlled in amplitude by said electrical signal as a feed back signal from said means for sensing said current;

said means for sensing current, said voltage-to-frequency conversion means, said high voltage secondary winding and said optical means, being in said high voltage section;

said light transmission means extending between said high voltage section and said low voltage section;

said optical receiver means, said means for utilizing the electrical signal, said low voltage primary winding means for applying an electrical current to said low voltage primary winding, and said primary winding being in the low voltage section.

11. Electrical apparatus in accordance with claim 10 further including:

a plurality of channels for receiving electrical power;

current transmitting means having a first transmitting position and a plurality of selectable other transmitting positions for transmitting current flowing through all of said channels through said means for sensing said current when in said first transmitting position, whereby the sum of all the currents flowing through all of the channels is measured and for transmitting current to at least one selected channel without flowing through said means for sensing said current when in one of said plurality of selectable other transmitting positions, whereby said means for transmitting light transmits a signal representing the current flowing through less than the totality of channels.

12. Electrical apparatus in accordance with claim 11 further including:

switching means for selecting one of said plurality of channels; and said switching means includes means for providing an indication of the channel, the current of which is being measured.

13. Electrical apparatus in accordance with claim 12 in which:

said switching means includes means for causing at least some current to bypass said measuring means; and said means for bypassing includes a means for indicting when the totality of the current flowing through said plurality of channels is being measured.

14. Electrical apparatus having within it a measuring means for measuring electrical current, comprising:

means for sensing said current and generating a voltage signal representing said current;

voltage-to-frequency conversion means for converting said voltage signal to a signal which varies in frequency in a manner related to the variations in amplitude of said voltage signal;

optical means for converting said voltage-to-frequency signal to a light signal;

light transmission means for transmitting said light signal from said optical means;

optical receiver means for receiving said light being transmitted through said light transmission means and converting it to an electrical signal;

means for utilizing the electrical signal for control purposes within said electrical apparatus;

said light transmission means including a light conductor for transmitting said light;

said light conductor having a length of at least two inches and being insulative;

said voltage-to-frequency conversion means including means for generating variable frequency electrical pulses having a pulse duration of less than 3 microseconds;

said voltage-to-frequency conversion means and said optical means comprising means for causing said current being measured to energize said light transmission means for transmitting said light signal;

said electrical apparatus including a high voltage portion and a low voltage portion;

a transformer having a low voltage primary winding and a high voltage secondary winding;

means for applying an electrical current to said low voltage primary winding under the control of said means for utilizing the electrical signal for control purposes within said electrical apparatus wherein the current through said primary winding is controlled in amplitude by said electrical signal as a feedback signal from said means for sensing said current;

said means for sensing current, said voltage-to-frequency conversion means, said high voltage secondary winding and said optical means, being in said high voltage section;

said light transmission means extending between said high voltage section and said low voltage section;

said optical receiver means, said means for utilizing the electrical signal, said low voltage primary winding means for applying an electrical current to said low voltage primary winding, and said primary winding being in the low voltage section;

a plurality of channels for receiving electrical power;

current transmitting means having a first transmitting position and a plurality of selectable other transmitting positions for transmitting current flowing through all of said channels through said means for sensing said current when in said first transmitting position, whereby the sum of all the currents flowing through all of the channels is measured, and for transmitting current to at least one selected channel without flowing through said means for sensing said current when in one of said plurality of selectable other transmitting positions, whereby said means for transmitting light transmits a signal representing the current flowing through less than the totality of channels;

switching means for selecting one of said first and other transmitting positions;

said switching means includes means for providing an indication of the channel, the current through which is being measured;

said switching means includes means for causing at least some current to bypass said measuring means;

said means for bypassing includes means for indicating when the totality of the current flowing through said plurality of channels is being measured;

said electrical apparatus being included in a power supply having means adapted to receive power from a mains source of power;

said means for bypassing at least some of said channels including switch means for electrically connecting a source of mains potential directly to one channel without passing through said optical transmitting means and electrically connecting other channels through said measuring means of said optical transmitting means.

15. Electrical apparatus in accordance with claim 14 in which said high-voltage portion of said light transmitting circuit requires no more than 75 microamps of current to operate.

16. Electrical apparatus in accordance with claim 15 in which said voltage-to-frequency converter includes pulse shaping means for providing an output pulse having a pulse duration of less than 3 microseconds and said means for generating light pulses includes a light-emitting diode.

17. Electrical apparatus having within it a measuring means for measuring electrical current, comprising:

means for sensing of said current and generating a voltage signal representing said current;

voltage-to-frequency conversion means for converting said voltage signal to a signal which varies in frequency in a manner related to the variations in amplitude of said voltage signal;

optical means for converting said voltage-to-frequency signal to a light signal;

light transmission means for transmitting said light signal from said optical means;

optical receiver means for receiving said light being transmitted through said light transmission means and converting it to an electrical signal;

means for utilizing the electrical signal for control purposes within said apparatus;

said voltage-to-frequency conversion means including means for generating variable frequency pulses having a pulse duration of less than 3 microseconds;

means for causing only said current being measured to energize said means for transmitting;

a plurality of channels for receiving electrical power;

current transmitting means having a first transmitting position and a plurality of selectable other transmitting positions for transmitting current flowing through all of said channels through said means for sensing said current when in said first transmitting position, whereby the sum of all the currents flowing through all of the channels is measured and for transmitting current to at least one selected channel without flowing through said means for sensing said current when in one of said plurality of selectable other transmitting positions, whereby said means for transmitting light transmits a signal representing the current flowing through less than the totality of channels.

18. Electrical apparatus in accordance with claim 17 further including:

switching means for selecting one of said plurality of channels; and said switching means includes means for providing an indication of the channel, the current of which is being measured.

19. Electrical apparatus in accordance with claim 18 in which said switching means includes means for causing at least some current to bypass said measuring means; and said means for bypassing includes a means for indicating when the totality of the current flowing through said plurality of channels is being measured.

20. Electrical apparatus having within it a measuring means for measuring electrical current, comprising:

means for sensing of said current and generating a voltage signal representing said current;

voltage-to-frequency conversion means for converting said voltage signal to a signal which varies in frequency in a manner related to the variations in amplitude of said voltage signal wherein said current being measured energizes said means for transmitting;

optical means for converting said voltage-to-frequency signal to a light signal;

light transmission means for transmitting said light signal from said optical means;

optical receiver means for receiving said light being transmitted through said light transmission means and converting it to an electrical signal;

means for utilizing the electrical signal for control purposes within said apparatus;

said voltage-to-frequency conversion means including means for generating variable frequency pulses having a pulse duration of less than 3 microseconds;

said pulse durations being 1 microsecond;

a plurality of channels for receiving electrical power;

current transmitting means having a first transmitting position and a plurality of selectable other transmitting positions for transmitting current flowing through all of said channels through said means for sensing said current when in said first transmitting position, whereby the sum of all the currents flowing through all of the channels is measured and for transmitting current to at least one selected channel without flowing through said means for sensing said current when in one of said plurality of selectable other transmitting positions, whereby said means for transmitting light transmits a signal representing the current flowing through less than the totality of channels;

switching means for selecting one of said first and other transmitting positions;

said switching means includes means for providing an indication of the channel, the current of which is being measured;

said switching means includes means for causing at least some current to bypass said measuring means;

said means for bypassing including means for indicating when the totality of the current flowing through said plurality of channels is being measured;

said electrical apparatus being included in a power supply having means adapted to receive power from a mains source of power;

said means for bypassing at least some of said channels including switch means for electrically connecting a source of mains potential directly to one channel without passing through said optical transmitting means and electrically connecting other channels through said measuring means of said optical transmitting means.

21. Electrical apparatus in accordance with claim 20 in which said high-voltage portion of said light transmitting circuit requires no more than 75 microamps of current to operate.

22. Electrical apparatus in accordance with claim 21 in which said voltage-to-frequency converter includes pulse shaping means for providing an output pulse having a pulse duration of less than 3 microseconds and said means for generating light pulses includes a light-emitting diode.

23. Electrical apparatus having within it a measuring means for measuring electrical current, comprising:
   means for sensing said current and generating a voltage signal representing said current;
   voltage-to-frequency conversion means for converting said voltage signal to a signal which varies in frequency in a manner related to the variations in amplitude of said voltage signal;
   optical means for converting said voltage-to-frequency signal to a light signal;
   light transmission means for transmitting said light signal from said optical means;
   optical receiver means for receiving said light being transmitted through said light transmission means and converting it to an electrical signal;
   means for utilizing the electrical signal for control purposes within said apparatus;
   said voltage-to-frequency conversion means and optical means comprising means for causing said current being measured to energize said light transmission means for transmitting said light signal, whereby a separate source of power is not needed to generate and transmit a feedback signal representing said electrical current;
   a plurality of channels for receiving electrical power;
   current transmitting means having a first transmitting position and a plurality of selectable other transmitting positions for transmitting current flowing through all of said channels through said means for sensing said current when in said first transmitting position, whereby the sum of all the currents flowing through all of the channels is measured and for transmitting current to at least one selected channel without flowing through said means for sensing said current when in one of said plurality of selectable other transmitting positions, whereby said means for transmitting light transmits a signal representing the current flowing through less than the totality of channels.

24. Electrical apparatus in accordance with claim 23 further including:
   switching means for selecting one of said plurality of channels; and
   said switching means includes means for providing an indication of the channel, the current of which is being measured.

25. Electrical apparatus in accordance with claim 24 in which:
   said switching means includes means for causing at least some current to bypass said measuring means; and
   said means for bypassing includes a means for indicating when the totality of the current flowing through said plurality of channels is being measured.

26. Electrical apparatus having within it a measuring means for measuring electrical current, comprising:
   means for sensing of said current and generating a voltage signal representing said current;
   voltage-to-frequency conversion means for converting said voltage signal to a signal which varies in frequency in a manner related to the variations in amplitude of said voltage signal;
   optical means for converting said voltage-to-frequency signal to a light signal;
   light transmission means for transmitting said light signal from said optical means;
   optical receiver means for receiving said light being transmitted through said light transmission means and converting it to an electrical signal;
   means for utilizing the electrical signal for control purposes within said apparatus;
   a plurality of channels for receiving electrical power;
   current transmitting means having a first transmitting position and a plurality of selectable other transmitting positions for transmitting current flowing through all of said channels through said means for sensing said current when in said first transmitting position, whereby the sum of all the currents flowing through all of the channels is measured and for transmitting current to at least one selected channel without flowing through said means for sensing said current when in one of said plurality of selectable other transmitting positions, whereby said means for transmitting light transmits a signal representing the current flowing through less than the totality of channels.

27. Electrical apparatus in accordance with claim 26 further including:
   switching means for selecting one of said plurality of channels; and
   said switching means includes means for providing an indication of the channel, the current of which is being measured.

28. Electrical apparatus in accordance with claim 27 in which,
   said switching means includes means for causing at least some current to bypass said measuring means; and
   said means for bypassing includes a means for indicating when the totality of the current flowing through said plurality of channels is being measured.

29. Electrical apparatus having within it a measuring means for measuring electrical current, comprising:
   means for sensing of said current and generating a voltage signal representing said current;
   voltage-to-frequency conversion means for converting said voltage signal to a signal which varies in frequency in a manner related to the variations in amplitude of said voltage signal;
   optical means for converting said voltage-to-frequency signal to a light signal;
   light transmission means for transmitting said light signal from said optical means;
   optical receiver means for receiving said light being transmitted through said light transmission means and converting it to an electrical signal;
   means for utilizing the electrical signal for control purposes within said apparatus;
   a plurality of channels for receiving electrical power;
   current transmitting means having a first transmitting position and a plurality of selectable other transmitting positions for transmitting current flowing through all of said channels through said means for sensing said current when in said first transmitting position, whereby the sum of all the currents flowing through all of the channels is measured for transmitting current to at least one selected channel without flowing through said means for sensing said current when in one of said plurality of selectable other transmitting positions, whereby said means for transmitting light transmits a signal representing the current flowing through less than the totality of channels;

switching means for selecting one of said first and other transmitting positions;

said switching means including means for providing an indication of the channel, the current of which is being measured;

said switching means including means for causing at least some current to bypass said measuring means;

said means for bypassing including means for indicating when the totality of the current flowing through said plurality of channels is being measured;

said electrical apparatus being included in a power supply having means adapted to receive power from a mains source of power;

said means for bypassing at least one of said channels including switch means for electrically connecting a source of mains potential directly to one channel without passing through said optical transmitting means and electrically connecting other channels through said measuring means of said optical transmitting means.

30. Electrical apparatus in accordance with claim 29 in which said high-voltage portion of said light transmitting circuit requires no more than 75 microamps of current to operate.

31. Electrical apparatus in accordance with claim 30 in which said voltage-to-frequency converter includes pulse shaping means for providing an output pulse having a pulse duration of less than 3 microseconds and said means for generating light pulses includes a light-emitting diode.

32. Electrical apparatus having within it a measuring means for measuring electrical current, comprising:

means for sensing of said current and generating a voltage signal representing said current;

voltage-to-frequency conversion means for converting said voltage signal to a signal which varies in frequency in a manner related to the variations in amplitude of said voltage signal;

optical means for converting said voltage-to-frequency signal to a light signal;

light transmission means for transmitting said light signal from said optical means;

optical receiver means for receiving said light being transmitted through said light transmission means and converting it to an electrical signal;

means for utilizing the electrical signal for control purposes within said apparatus;

switching means for selecting one of said first and other transmitting positions; said switching means including means for providing an indication of the channel, the current of which is being measured.

33. Electrical apparatus in accordance with claim 32 in which:

said switching means includes means for causing at least some current to bypass said measuring means; and said means for bypassing includes a means for indicating when the totality of the current flowing through said plurality of channels is being measured.

34. Electrical apparatus in accordance with claim 33 in which said means for bypassing at least some of said channels includes:

said electrical apparatus being included in a power supply having means adapted to receive power from a mains source of power; and switch means for electrically connecting a source of mains potential directly to one channel without passing through said optical transmitting means and electrically connecting other channels through said measuring means of said optical transmitting means.

35. Electrical apparatus in accordance with claim 34 in which said high-voltage portion of said light transmitting circuit requires no more than 75 microamps of current to operate.

36. Electrical apparatus in accordance with claim 35 in which said voltage-to-frequency converter includes pulse shaping means for providing an output pulse having a pulse duration of less than 3 microseconds and said means for generating light pulses includes a light-emitting diode.

37. Electrical apparatus having within it a measuring means for measuring electrical current, comprising:

means for sensing of said current and generating a voltage signal representing said current;

voltage-to-frequency conversion means for converting said voltage signal to a signal which varies in frequency in a manner related to the variations in amplitude of said voltage signal;

optical means for converting said voltage-to-frequency signal to a light signal;

light transmission. means for transmitting said light signal from said optical means;

optical receiver means for receiving said light being transmitted through said light transmission means and converting it to an electrical signal;

means for utilizing the electrical signal for control purposes within said apparatus;

said light transmission means including a switching means;

said switching means including means for causing at least some current to bypass said measuring means; and said means for causing at least some current to bypass includes a means for indicating when the totality of the current flowing through said plurality of channels is being measured.

38. Multiple channel apparatus comprising:

at least first and second channels;

means for applying electrical energy to said first and second channels;

means for measuring electrical parameters in said first and second channels;

setpoint means;

feedback means from said means for measuring for controlling the amount of electrical energy applied to said first and second channels in accordance with the setpoint means;

means for selectively measuring either the current through all of said channels or the current through only one of said channels;

said means for selectively measuring including means for storing a value corresponding to the voltage on the channels and maintaining the voltage on the channels constant by said feedback means when the measurements for one of said channels is selected and returning to a measurement of all parameters directly when all of said channels are being monitored; and said stored value being used in said feedback network instead of said setpoint means.

39. Electrical apparatus having within it a measuring means for measuring electrical parameters including at least current and voltage comprising:

means for sensing current and generating a voltage signal representing said current;

a plurality of channels through which said current flows;

current transmitting means having a first transmitting position and a plurality of selectable other transmitting positions for transmitting current flowing through all of said channels through said means for sensing said current when in said first transmitting position, whereby the sum of all the currents flowing through all of the channels is measured, and for transmitting current to at least one selected channel without flowing through said means for sensing said current when in one of said plurality of selectable other transmitting positions, whereby said means for transmitting light transmits a signal representing the current flowing through less than the totality of channels;

switching means for selecting one of said first and second transmitting positions; and said switching means including means for providing an indication of the channel, the current of which is being measured.

40. Electrical apparatus in accordance with claim 39 in which said switching means includes:

means for causing at least some current to bypass said measuring means; and said means for bypassing includes a means for indicating when the totality of the current flowing through said plurality of channels is being measured.

41. Electrical apparatus in accordance with claim 40 in which said current transmitting means includes a voltage-to-frequency converter; said voltage-to-frequency converter includes pulse shaping means for providing an output pulse having a pulse duration of less than 3 microseconds and said means for generating light pulses includes a light-emitting diode.

42. Electrical apparatus in accordance with claim 39 in which said voltage-to-frequency converter includes pulse shaping means for providing an output pulse having a pulse duration of less than 3 microseconds and said means for generating light pulses includes a light-emitting diode.

43. Electrical apparatus having within it a measuring means for measuring electrical parameters including at least current and voltage comprising:

means for sensing current and generating a voltage signal representing said current;

a plurality of channels through which said current flows;

current transmitting means having a first transmitting position and a plurality of selectable other transmitting positions for transmitting current flowing through all of said channels through said means for sensing said current when in said first transmitting position, whereby the sum of all the currents flowing through all of the channels is measured, and for transmitting current to at least one selected channel without flowing through said means for sensing said current when in one of said plurality of selectable other transmitting positions, whereby said means for transmitting light transmits a signal representing the current flowing through less than the totality of channels;

said switching means including means for causing at least some current to bypass said measuring means; and said means for bypassing including a means for indicating when the totality of the current flowing through said plurality of channels is being measured.

44. Electrical apparatus having within it a measuring means for measuring electrical parameters including at least current and voltage comprising:

means for sensing current and generating a voltage signal representing said current;

a plurality of channels through which said current flows;

current transmitting means having a first transmitting position and a plurality of selectable other transmitting positions for transmitting current flowing through all of said channels through said means for sensing said current when in said first transmitting position, whereby the sum of all the currents flowing through all of the channels is measured, and for transmitting current to at least one selected channel without flowing through said means for sensing said current when in one of said plurality of selectable other transmitting positions, whereby said means for transmitting light transmits a signal representing the current flowing through less than the totality of channels;

a voltage-to-frequency converter connected to and forming a part of said current transmitting means;

said voltage-to-frequency converter including pulse shaping means for providing an output pulse having a pulse duration of less than 3 microseconds and said means for generating light pulses includes a light-emitting diode.

45. A method of measuring electrical parameters including at least current and voltage, with a current measuring circuit in an apparatus comprising the steps of:

sensing one of said current and voltage parameters and generating a voltage signal representing said parameters;

converting said voltage signal to a signal which varies in frequency in a manner related to the variations in amplitude of said voltage signal in a voltage-to-frequency conversion means;

converting said voltage-to-frequency signal to a light signal in optical means;

transmitting said light signal from said optical means through a light transmission means;

converting said light signal to an electrical signal;

utilizing the electrical signal for control purposes within said apparatus;

said step of transmitting including the step of transmitting light through a light conductor having a length of at least 2 inches and being insulative extending between a high-voltage section and a low-voltage section, whereby the portions of said current measuring circuit in said low-voltage portion are freed from the amount of insulation required on the high-voltage section;

said step of converting including the step of generating variable frequency pulses having pulse durations of less than 3 microseconds; and the step of measuring including energizing the voltage-to-frequency conversion means and optical means with only said current to cause light to be transmitted.

46. A method in accordance with claim 45 further including the steps of:

transmitting current flowing through a plurality of different channels through said light transmitting system, whereby the sum of all the currents flowing through all of the channels is measured; and transmitting current to at least one selected channel without flowing through said means for transmitting light, whereby said means for transmitting light transmits a signal representing the current flowing through only channels less than the totality of channels.

47. A method in accordance with claim 45 including indicating when the totality of the current flowing through said plurality of channels is being measured.

48. A method comprising:

applying electrical energy to first and second channels during first and second times;

measuring electrical parameters in said first and second channels;

controlling the amount of electrical energy applied to said first and second channels by feedback means in accordance with a setpoint value during one of said first and second times;

selectively measuring either the current through all of said channels or the current through only one of said channels;

storing a value corresponding to the voltage on the channels during said one of said first and second times and maintaining the voltage on the channels constant with said feedback means when the measurements for one of said channels is selected and returning to a measurement of all parameters directly when all of said channels are being monitored; and using said stored values in said feedback network instead of said setpoint value during the other of said first and second times.

49. Electrical apparatus having within it a measuring means for measuring electrical current, comprising:

means for sensing said current and generating a voltage signal representing said current;

voltage-to-frequency conversion means for converting said voltage signal to a signal which varies in frequency in a manner related to the variations in amplitude of said voltage signal;

optical means for converting said voltage-to-frequency signal to a light signal;

light transmission means for transmitting said light signal from said optical means;

optical receiver means for receiving said light being transmitted through said light transmission means and converting it to an electrical signal;

means for utilizing the electrical signal for control purposes within said apparatus;

said means for utilizing the electrical signal for control purposes including: electrical energy setpoint means; said apparatus being adapted to be connected to a load; output means of said electrical apparatus for applying electrical energy to said load; means for measuring electrical parameters related to said electrical energy setpoint means; said means for measuring electrical parameters including said means for measuring electrical current; and feedback means providing feedback from said means for measuring electrical parameters for controlling the amount of electrical signal applied to said output means in accordance with the setpoint means; said means for measuring including means for storing a value corresponding to the voltage on the output means and maintaining the voltage on the output means constant by said feedback means at one point in time and at another point in time measuring of all parameters directly while said stored value is used in said feedback means instead of said setpoint means to keep said voltage on the output means constant.

50. A method of measuring electrical parameters including at least current and voltage, comprising the steps of:

sensing one of said current and voltage parameters and generating a voltage signal representing said parameters;

converting said voltage signal to a signal which varies in frequency in a manner related to the variations in amplitude of said voltage signal;

converting said voltage-to-frequency signal to a light signal;

transmitting said light signal from said optical means through said light transmission means;

converting said light to an electrical signal;

utilizing the electrical signal for control purposes within said apparatus;

the step of utilizing the electrical signal including the steps of: applying electrical energy to output means adapted to be connected to a load; measuring electrical parameters related to said electrical energy wherein one of said parameters is current; and controlling the amount of electrical energy applied to output means by feedback means in accordance with a setpoint value; and storing a value corresponding to the voltage on the output means;

maintaining the voltage on the output means constant with said feedback means at certain times; and returning to a measurement of all parameters at other times using said stored values in said feedback network instead of said setpoint value, wherein the output voltage is controlled by feedback from said setpoint value at said certain times and by said stored value at other times.

51. Electrical apparatus having within it a measuring means for measuring electrical current, comprising:

means for sensing said current and generating a voltage signal representing said current by variations in amplitude;

a plurality of channels through which said current flows;

current transmitting means having a first transmitting position and a plurality of selectable other transmitting positions for transmitting current flowing through all of said channels through said means for sensing said current when in said first transmitting position, whereby the sum of all the currents flowing through all of the channels is measured, and for transmitting current to at least one selected channel without flowing through said means for sensing said current when in one of said plurality of selectable other transmitting positions, whereby said means for transmitting light transmits a signal representing the current flowing through less than the totality of channels;
conversion means for converting said voltage signal to a pulsed signal which varies in a manner related to the variations in amplitude of said current;
optical means for converting said pulsed signal to a light signal;
light transmission means for transmitting said light signal from said optical means;
optical receiver means for receiving said light being transmitting through said light transmission means and converting it to an electrical output signal;
means for utilizing the electrical output signal for control purposes within said apparatus; and
switching means for selecting ones of said first and other transmitting positions; said switching means including means for providing an indication of the channel, the current of which is being measured.

* * * * *